United States Patent [19]

Hayes

[11] Patent Number: 4,981,497

[45] Date of Patent: Jan. 1, 1991

[54] AMINE-MODIFIED POLYIMIDE MEMBRANES

[75] Inventor: Richard A. Hayes, Parkersburg, W. Va.

[73] Assignee: E. I. du Pont de Nemours and Company, Wilmington, Del.

[21] Appl. No.: 360,042

[22] Filed: Jun. 1, 1989

[51] Int. Cl.[5] ........................ B01D 53/22; B01D 71/64

[52] U.S. Cl. ............................................ 55/16; 55/158

[58] Field of Search ............... 55/16, 158; 210/500.38, 210/500.39

[56] References Cited

U.S. PATENT DOCUMENTS

| | | | |
|---|---|---|---|
| Re. 30,351 | 7/1980 | Hoehn et al. | 55/158 X |
| 3,533,997 | 10/1970 | Angelo | 260/47 |
| 3,822,202 | 7/1974 | Hoehn | 55/158 X |
| 3,899,309 | 8/1975 | Hoehn et al. | 55/158 X |
| 4,113,268 | 9/1978 | Simmons et al. | 277/168 |
| 4,378,400 | 3/1983 | Makino et al. | 55/158 X |
| 4,440,643 | 4/1984 | Makino et al. | 55/158 X |
| 4,468,500 | 8/1984 | Malon et al. | 55/158 X |
| 4,468,501 | 8/1984 | Zampini et al. | 55/158 X |
| 4,468,502 | 8/1984 | Malon et al. | 55/158 X |
| 4,468,503 | 8/1984 | Zampini et al. | 55/158 X |
| 4,471,394 | 9/1984 | Hapke | 360/92 |
| 4,512,893 | 4/1985 | Makino et al. | 55/158 X |
| 4,530,703 | 7/1985 | Malon et al. | 55/158 X |
| 4,652,283 | 3/1987 | Zampini et al. | 55/158 |
| 4,654,055 | 3/1987 | Malon et al. | 55/158 |
| 4,663,050 | 5/1987 | Li et al. | 55/16 X |
| 4,690,873 | 9/1987 | Makino et al. | 55/158 X |
| 4,695,592 | 9/1987 | Itoh et al. | 210/500.38 X |
| 4,705,540 | 11/1987 | Hayes | 55/158 X |
| 4,717,393 | 1/1988 | Hayes | 55/158 X |
| 4,717,394 | 1/1988 | Hayes | 55/16 |
| 4,734,464 | 3/1988 | Biensan | 525/420 |
| 4,746,474 | 5/1988 | Kohn | 55/16 X |
| 4,761,234 | 8/1988 | Uemura et al. | 210/500.38 |
| 4,764,320 | 8/1988 | Chau et al. | 55/16 X |
| 4,775,474 | 10/1988 | Chau et al. | 55/16 X |
| 4,812,238 | 3/1989 | Cadotte et al. | 210/500.38 X |
| 4,824,916 | 4/1989 | Kershner et al. | 210/500.38 X |

FOREIGN PATENT DOCUMENTS

| | | |
|---|---|---|
| 0113574 | 7/1984 | European Pat. Off. . |
| 0203770 | 12/1986 | European Pat. Off. . |
| 0244967 | 11/1987 | European Pat. Off. . |
| 1435151 | 5/1976 | United Kingdom . |

*Primary Examiner*—Robert Spitzer

[57] ABSTRACT

Process of reacting polyimide membranes for separation of mixtures of fluids and particularly separation of mixtures of gas with primary or secondary mono-, di-, tri- or polyamines and the resultant products are disclosed. This modification results in improved gas permeation properties and, in some cases, improved environmental resistance.

12 Claims, No Drawings

AMINE-MODIFIED POLYIMIDE MEMBRANES

BACKGROUND OF THE INVENTION

The present invention relates to improving the performance of polyimide membranes and particularly aromatic polyimide membranes as used for the separation of mixtures of gases. Aromatic polyimide gas separation membranes are known in the art. Such membranes generally fall within one of two categories. One such category incorporates membranes with high relative selectivities for one gas over another gas permeating through the membrane. Such membranes, however, suffer from having low gas permeation rates. This category of aromatic polyimide gas separation membranes is exemplified by U.S. Pat. No. 4,113,268; U.K. No. 1,435,151; U.S. Pat. No. 4,378,400; and EPO No. 113,574. Another category of polyimide gas separation membranes have much higher gas permeation rates, but suffer from correspondingly lower relative gas selectivities. Such materials are exemplified with U.S. Re. 30,351; U.S. Pat. No. 3,822,202; U.S. Pat. No. 3,899,309; U.S. Pat. No. 4,705,540; U.S. 4,717,394.

Many of the polyimides disclosed in the above-cited references are soluble in typical laboratory solvents. While this property is very desirable for ease of fabrication of gas separation membranes, it is undesirable for such gas separation membranes with respect to environmental conditions encountered during use thereof.

It is desirable to have polyimide gas separation membranes which exhibit high gas permeation rates while maintaining high relative gas selectivities. Further, it is desirable for such materials to be easily fabricated into appropriate membrane structures while maintaining excellent end use environmental resistance. One class of polyimide materials which incorporate many of these desirable characteristics are described in U.S. Pat. No. 4,717,393. These materials suffer from the inclusion of a complicated photochemical step within the process.

PRIOR ART

U.S. Pat. No. 3,533,997 discloses aromatic polyimides which incorporate a pendant carboxylic acid function and the crosslinking of such materials through interaction of the pendant carboxylic acid functions and di- to tetra- amine radicals. The polyimides of the present invention do not contain such pendant carboxylic acid functions.

U.S. Pat. No. 4,734,464 discloses a solvent resistant composition comprising a siloxane-containing polyimide and an aromatic compound containing at least two reactive groups such as amino groups which are heated to at least 150° C. The present invention does not incorporate siloxane-containing polyimides or the high temperature treatment.

EPO No. 203,770 and EPO No. 244,967 disclose the preparation of polyamides through the high temperature interaction between an aromatic bisimide compound and amine functions.

SUMMARY OF THE INVENTION

The present invention involves reacting a polyimide with ammonia or an amine. Preferably a di- or higher functional amine is used. It is believed that the amine reacts with one of the carbonyl functions of the imide groups contained in the polyimide to form a polyamide having pendent amide groups which if di- or higher functional can serve to crosslink the resulting polyimide-amide.

DETAILED DESCRIPTION

The present invention provides for an amine-modification of gas separation membranes which include a plurality of imide links. Such modification results in gas separation membranes with improved gas productivity and, in part, environmental stability.

The chemical composition of the imide-containing resin is not a limitation of this invention. Suitable imide-containing materials include aromatic polyimides, aliphatic polyimides, poly(maleimide) and copolymers thereof, polyetherimides and the like. These should not be taken as a limitation. Virtually any imide-containing materials are suitable. Such imide function need not be in the main polymer chain.

The preferred imide-containing materials for use in the present invention are the aromatic polyimides. Generally, the aromatic polyimides have the following structural formula:

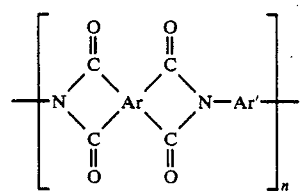

where <Ar> is a radical selected from the group consisting of

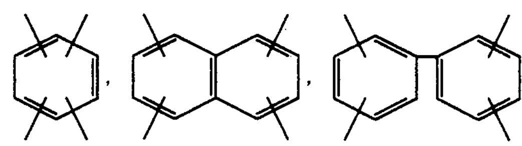

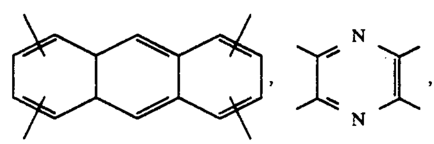

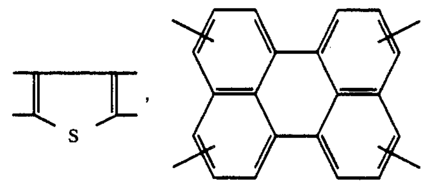

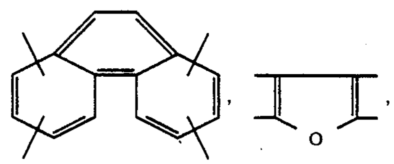

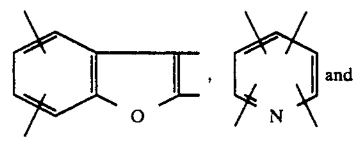

-continued

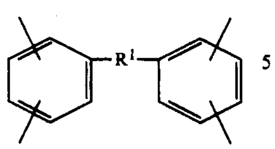

where —$R^1$— is selected from the group consisting of an alkylene chain having 1-3 carbon atoms,

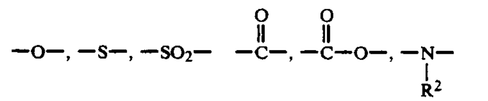

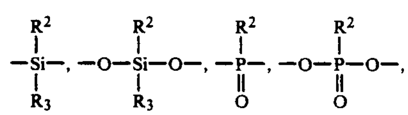

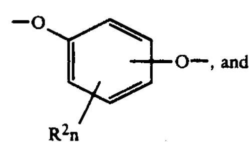

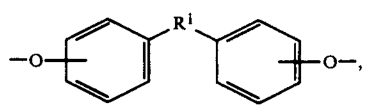

where $R^2$ and $R^3$ are selected from the group consisting of alkyl and aryl, and —$R^1$— has the meaning defined above. $Ar^1$ is a radical selected from the group consisting of

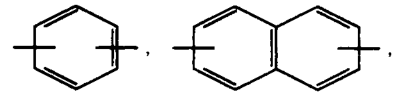

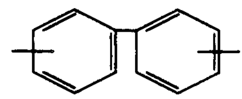

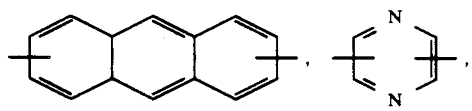

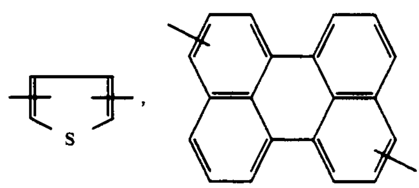

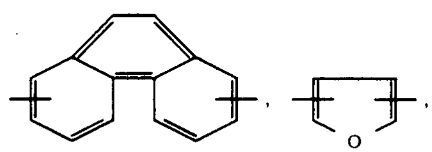

-continued

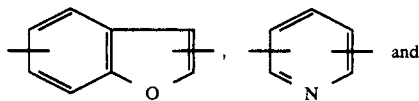

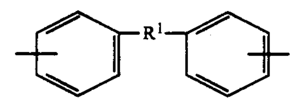

where $R^1$ has the same meaning as above; and n is a number sufficient that said polymer has an inherent viscosity of at least 0.1 as measured at 30° C. on an 0.5% by weight solution in concentrated sulfuric acid.

The amine modification of the present invention includes contacting an imide-containing material with a suitable amine functional composition and chemically reacting the amine component with the imide. It is believed that this chemical modification involves the opening of some of the imide functions to form ortho-diamide functions, as shown below:

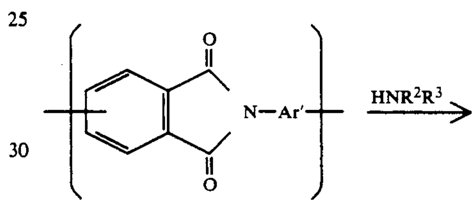

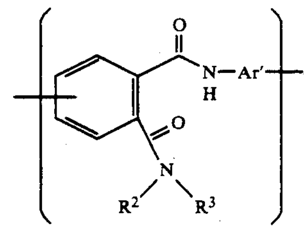

Such a mechanism would help explain the greatly improved gas selectivities and environmental resistance observed, especially when di- or higher amine functional materials are used. The use of the herein described amine-modification of imide-containing materials is not predicted upon the actual details of the mechanism and the above suggested mechanistic details should not limit the use of the invention.

Suitable amine functional compositions for the present invention incorporates primary and/or secondary amines. The functionality of such materials encompasses mono-, di, tri-, tetra-, and polyamines. Examples of suitable amino-compositions include ammonia, hydrazine, aliphatic amines, aliphatic-aromatic amines and aromatic amines. Specific examples of aliphatic amines include methylamine, ethylamine, propylamine, isopropylamine, butylamine, isobutylamine, cyclohexylamine, dimethylamine, diethylamine, dipropylamine, diisopropylamine, ethylene diamine, N,N'-dimethylethylene diamine, N,N'-diethylethylenediamine, diethylenetriamine, triethylenetetraamine, tetraethylene pentaamine, pentaethylenehexamine, polyethyleneimine, JEFFAMINE compositions (products of Texaco which are diamines having a polyether backbone derived from ethylene oxide), polyallylamine, polyvinylamine, 3-aminopropyldimethylethoxysilane, 3-aminopropyldiethoxysilane, N-methylaminopropyltrimethoxysilane, 3-aminopropyltriethoxysilane, N-methylaminopropyltrimethoxysilane, 3-aminopropyl terminated polydimethylsiloxanes, and the like. Specific examples of aliphatic aromatic amines include benzylamine, metaxylylenediamine, para-xylylenediamine and the like. Specific examples of aromatic amines include aniline, aniline derivatives, phenylene diamines, methylene dianiline, oxydianiline and the like. These should not be taken as a limitation. Virtually all primary and secondary amino compositions are suitable.

Thus the amine functional compositions for use in the present invention includes ammonia and various amines which in the case of polymeric amines such as polyethyleneimine may contain a very large number of amino groups, i.e. up to 5,000. The preferred amino compounds are aromatic compounds containing 2 or 3 amino groups and 6 to 30 carbon atoms, or aliphatic compounds containing 2 to 6 amino groups and 1 to 40 carbon atoms.

As one skilled in the art will appreciate, the rate of reaction between the amino-composition and the imide-containing material will vary greatly dependent on their chemical identity and the process conditions. For pairs of amino-compositions and imide-containing materials which rapidly react with each other, the amine-modification process can include contacting the imide-containing membrane with the amino composition, either alone or as a mixture in an added component which is a nonsolvent for imide-containing membrane, followed by drying the amino-modified membrane. The membrane may be dried at elevated temperatures to complete the reaction. For pairs which react slowly or not at all under ambient conditions, the reaction may proceed at elevated temperatures. The process may be as before or the two components can be incorporated within the membrane formation procedure and allowed to react thereafter.

The amine modified polyimide membranes disclosed herein find use in many applications other than as gas separation membranes. For example, in electronics, a passivating coating may be made solvent resistant using the amine modifications disclosed herein. Further, the amine modifications, as taught herein, of ultrafiltration and microfiltration membranes can be used to help prevent flux declines due to fouling by changing the surface of such membranes from hydrophobic to hydrophillic. The procedure of the present invention can be used to assist in the attachment of active agents, such as proteins and the like for specific chemical separations or biochemical reactors.

EXAMPLES

Preparative Example 1

To a stirred solution of 2,4,6-trimethyl-1,3-phenylene diamine (240.37 g, 1.60 mol) in N-methylpyrrolidone (2.5 L) was added 4,4'-[2,2,2-trifluoro-1-(trifluoromethyl)ethylidene]-bis (1,2-benzenedicarboxylic acid anhydride) (6FDA, 542.98 g, 1.132 mol) under a nitrogen atmosphere at room temperature. 6FDA has the formula:

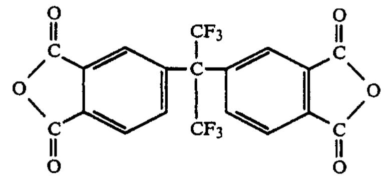

The resulting reaction solution was slowly heated to 203° C. over 3 hours with a slow nitrogen purge, distilling off 480 ml liquid (water and N-methylpyrrolidone). The slightly viscous reaction solution was allowed to reflux at 203° C. for 6.5 hours. The very viscous reaction solution was cooled to room temperature, diluted with acetone and precipitated in water to give an off-white solid. The product was washed with water and methanol and air-dried overnight. The polymer was further dried in a vacuum oven (20 inches, (51 cm), mercury) at 120° C. for 3 hours and at 250° C. for 5 hours.

This polyimide was found to be soluble in acetone, methylene dichloride, N,N-dimethylformamide, methyl ethyl ketone, N,N-dimethylacetamide, methyl acetate, tetrahydrofuran, N-methylpyrrolidone, dioxane, dimethylsulfoxide, propylene carbonate, gamma-butyrolactone, and m-cresol.

Films were cast from a 15% solution of the above polymer (based on weight) in N-methyl-pyrrolidone onto a glass plate treated with Du Pont TEFLON® dry lubricant at 100° C. with a 15-mil ($38\times10^{-5}$ m) knife gap. TEFLON® dry lubricant contains a fluorocarbon telomer which reduces the adhesion of the film to the glass plate. The films were dried on the plate at 100° C. for 30 minutes, cooled to room temperature and dried in a vacuum oven (20 inches (50.1 cm) mercury) at room temperature overnight. The films were removed from the plate and dried in a vacuum oven (20 inches (51 cm) mercury) at 120° C. for 4 hours.

A film, prepared as above with a thickness of 1.05 mil ($2.7\times10^{-5}$ m), was tested for mixed gas oxygen/nitrogen (21/79, mole) permeabilities at 548 psig ($3.78\times10^4$ Pa), room temperature. Results are reported below:

$O_2$ Permeability: 7,300 centiBarrer $O_2/N_2$ Selectivity: 3.8

A centiBarrer is the number of cubic centimeters of gas passed by the membrane at standard temperature and pressure times the thickness of the membrane in centimeters times $10^{-12}$ divided by the permeating area of the membrane in square centimeters times the time in seconds [centimeters times the time in seconds] times the partial pressure difference across the membrane in cm Hg, i.e., $$\text{centiBarrer} = 10^{-12} \frac{\text{cm}^3\text{ (STP)} - \text{cm}}{\text{cm}^2 - \text{sec} - \text{cmHg}}$$

EXAMPLE 1

A film prepared as in Preparative Example 1 was soaked in a 5% aqueous cyclohexylamine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A very small amount of swollen polymer strands remained out of solution.

The film was tested for mixed gas oxygen/nitrogen (21/79 mole) permeabilities at 510 psig ($356\times10^4$ Pa), 25° C. Results are reported below.

$O_2$ Permeability: 2600 centiBarrer $O_2/N_2$ Selectivity: 5.5

EXAMPLE 2

A film prepared as in Preparative Example 1 was soaked in a 5% aqueous cyclohexylamine solution (by weight) for 1 hour at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A very small amount of swollen polymer strands remained out of solution.

The film was tested for mixed gas oxygen/nitrogen (21/79 mole) permeabilities at 508 psig ($355\times10^4$ Pa), 25° C. Results are reported below.

$O_2$ Permeability: 100 centiBarrer $O_2/N_2$ Selectivity: 6.8

EXAMPLE 3

A film prepared as in Preparative Example 1 was soaked in a 1% aqueous 1,6-hexanediamine solution (by weight) for 88 hours at room temperature. The film was removed from the solution, drained and dried in a vacuum oven (25 inches (63.3 cm) mercury) at 75° C. for 4 hours. A portion of the film was placed in N-methylpyrrolidone, a good solvent for the uncrosslinked polymer. Sheets of slightly swollen film remained out of solution.

The film, which was 1.3 mils ($3.3\times10^{-5}$ m) was tested for mixed oxygen/nitrogen (21/79 mole) permeabilities at 500 psig ($349\times10^4$ Pa), room temperature. Results are reported below.

$O_2$ Permeability: 1400 centiBarrer $O_2/N_2$ Selectivity: 4.4

EXAMPLE 4

A film prepared as in Preparative Example 1 was soaked in a 1% solution of 3-aminopropylmethyldiethoxysilane in FREON ® 113 (1,1,2-trichloro-1,2,2-trifluoroethane) (by weight) for 5 minutes at room temperature. The film was removed from the solution, drained and dried in a vacuum oven (20 inches (51 cm) mercury) at 100° C. overnight. A portion of the film was placed in N-methylpyrrolidone, a good solvent for the untreated polymer. A large amount of swollen polymer strands remained out of solution.

The film, which was 1.7 mils ($4.3\times10^{-5}$ m) thick, was tested for mixed gas oxygen/nitrogen (21/79, mole) permeabilities at 496 psig ($346\times10^4$ Pa), 24° C. Results are reported below:

$O_2$ Permeability: 3600 centiBarrer $O_2/N_2$ Selectivity: 5.2

EXAMPLE 5

A film prepared as in Preparative Example 1 was soaked in a 1% solution of 3-aminopropylmethyldiethoxysilane in FREON ® 113 (by weight) for 15 minutes at room temperature. The film was removed from the solution, drained and dried in a vacuum oven (20 inches (51 cm) mercury) at 100° C. overnight. A portion of the film was placed in N-methylpyrrolidone, a good solvent for the untreated polymer. A large amount of large swollen polymer strands remained out of solution.

The film, which was 1.4 mils ($3.6\times10^{-5}$ m) thick, was tested for mixed gas oxygen/nitrogen (21/79, mole) permeabilities at 496 psig ($341\times10^4$ Pa), 24° C. Results are reported below:

$O_2$ Permeability: 2500 centiBarrer $O_2/N_2$ Selectivity: 4.8

EXAMPLE 6

A film prepared as in Preparative Example 1 was soaked in a 1% aqueous tris(2-aminoethyl)amine solution (by weight) for 30 hours at room temperature. The film was removed from the solution, drained and dried in a vacuum oven (20 inches (51 cm) mercury) at room temperature overnight. A portion of the film was placed in N-methylpyrrolidone, a good solvent for the uncrosslinked polymer. Long strands of swollen polymer remained out of solution.

The film was tested for mixed gas oxygen/nitrogen (21/79 mole) permeabilities at 500 psig ($345\times10^4$ Pa), room temperature. Results are reported below:

$O_2$ Permeability: 2300 centiBarrer $O_2/N_2$ Selectivity: 5.6

EXAMPLE 7

A film prepared as in Preparative Example 1 was soaked in a 1% aqueous triethylenetetramine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A large swollen polymer strand remained out of solution.

The film, which was 1.1 mils ($2.8\times10^{-5}$ m) thick, was tested for mixed gas oxygen/nitrogen (21/79, mole) permeabilities at 512 psig ($353\times10^4$ Pa), 25° C. Results are reported below:

$O_2$ Permeability: 1100 centiBarrer $O_2/N_2$ Selectivity: 6.8

EXAMPLE 8

A film prepared as in Preparative Example 1 was soaked in a 1% aqueous triethylenetetramine solution (by weight) for 1 hour at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A large swollen polymer strand remained out of solution.

The film, which was 1.2 mils ($3\times10^{-5}$ m) thick, was tested for mixed gas oxygen/nitrogen (21/79, mole) permeabilities at 510 psig ($552\times10^4$ Pa), 25° C. Results are reported below:

$O_2$ Permeability: 500 centiBarrer $O_2/N_2$ Selectivity: 6.8

EXAMPLE 9

A film prepared as in Preparative Example 1 was soaked in a 1% aqueous pentaethylenehexamine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A moderate amount of long, swollen polymer strands remained out of solution.

The film, which was 1.05 mils ($2.67\times10^{-5}$ m) thick, was tested for mixed gas oxygen/nitrogen (21/79, mole) permeabilities at 498 psig ($343\times10^{4}$ Pa), 25° C. Results are reported below:

$O_2$ Permeability: 500 centiBarrer $O_2/N_2$ Selectivity: 9.8

EXAMPLE 10

A film prepared as in Preparative Example 1 was soaked in a 1% aqueous pentaethylenehexamine solution (by weight) for 1 hour at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A moderate amount of long, swollen polymer strands remained out of solution.

The film, which was 1.05 mils ($2.67\times10^{-5}$ m) thick, was tested for mixed gas oxygen/nitrogen (21/79, mole) permeabilities at 500 psig ($345\times10^{4}$ Pa), 25° C. Results are reported below:

$O_2$ Permeability: 300 centiBarrer $O_2/N_2$ Selectivity: 8.0

EXAMPLE 11

A film prepared as in Preparative Example 1 was soaked in a 1% aqueous JEFFAMINE ED-900 solution (by weight) for 5 minutes at room temperature. JEFFAMINE ED-900, a product of Texaco Chemical Company, is a polyether diamine based on a predominantly polyethylene oxide backbone with an approximate molecular weight of 900. The film was removed from the solution, drained and dried in a vacuum oven (20 inches (51 cm) mercury) at 70° C. overnight. A portion of the film was placed in N-methylpyrrolidone, a good solvent for the untreated polymer. A large amount of swollen polymer strands stayed out of solution.

The film, which was 1.3 mils ($3.3\times10^{-5}$ m) thick, was tested for mixed gas oxygen/nitrogen (21/79 mole) permeabilities at 535 psig ($369\times10^{4}$ Pa), 24° C. Results are reported below:

$O_2$ Permeability: 2800 centiBarrer $O_2/N_2$ Selectivity: 4.3

EXAMPLE 12

A film prepared as in Preparative Example 1 was soaked in a 0.1% methanolic trimethoxysilylpropyl-substituted polyethyleneimine (Petrarch Systems, Inc.; P5076) solution (by weight) for 10 minutes at room temperature. The film was removed from the solution, drained and dried at 70° C. for 1 hour and then in a vacuum oven (20 inches (51 cm) mercury) at 70° C. overnight. A portion of the film was placed in N-methylpyrrolidone, a good solvent for the untreated polymer. A moderate amount of swollen polymer strands remained out of solution.

The film, which was 1.6 mils ($4.1\times10^{-5}$ m) thick, was tested for mixed gas oxygen/nitrogen (21/79 mole) permeabilities at 505 psig ($348\times10^{4}$ Pa), 24° C. Results are reported below:

$O_2$ Permeability: 3600 centiBarrer $O_2/N_2$ Selectivity: 4.4

EXAMPLE 13

A film prepared as in Preparative Example 1 was soaked in a 0.1% methanolic trimethoxysilylpropyl-substituted polyethyleneimine (Petrarch Systems, Inc.; P5076) solution (by weight) for 40 minutes at room temperature. The film was removed from the solution, drained and dried at 70° C. for 1 hour and then in a vacuum oven (20 inches (51 cm) mercury) at 70° C. overnight. A portion of the film was placed in N-methylpyrrolidone, a good solvent for the untreated polymer. A large amount of swollen polymer strands remained out of solution.

The film, which was 1.04 mils ($2.6\times10^{-5}$ m) thick, was tested for mixed gas oxygen/nitrogen (21/79 mole) permeabilities at 505 psig ($349\times10^{4}$ Pa), 24° C. Results are reported below:

$O_2$ Permeability: 4500 centiBarrer $O_2/N_2$ Selectivity: 4.2

EXAMPLE 14

A film prepared as in Preparative Example 1 was soaked in a 0.1% methanolic trimethoxysilylpropyl-substituted polyethyleneimine (Petrarch Systems, Inc.; P5076) solution (by weight) for 160 minutes at room temperature. The film was removed from the solution, drained and dried at 70° C. for 1 hour and then in a vacuum oven (20 inches (51 cm) mercury) at 70° C. overnight. A portion of the film was placed in N-methylpyrrolidone, a good solvent for the untreated polymer. A large amount of swollen polymer strands remained out of solution.

The film, which was 1.6 mils ($4.1\times10^{-5}$ m) thick, was tested for mixed gas oxygen/nitrogen (21/79 mole) permeabilities at 505 psig ($349\times10^{4}$ Pa), 24° C. Results are reported below:

$O_2$ Permeability: 3400 centiBarrer $O_2/N_2$ Selectivity: 4.5

EXAMPLE 15

A film prepared as in Preparative Example 1 was soaked in a 0.05% aqueous polyethyleneimine (M.W. =50,000–60,000) solution (by weight) for 60 minutes at room temperature. The film was removed from the solution, drained and dried in a vacuum oven (20 inches (51 cm) mercury) at 100° C. overnight. A portion of the film was placed in N-methylpyrrolidone, a good solvent for the untreated polymer. A small amount of large swollen polymer strands remained out of solution.

The film, which was 1.14 mils ($2.9\times10^{-5}$ m) thick, was tested for mixed gas oxygen/nitrogen (21/79 mole) permeabilities at 514 psig ($354\times10^{4}$ Pa), 24° C. Results are reported below:

$O_2$ Permeability: 800 centiBarrer $O_2/N_2$ Selectivity: 4.7

EXAMPLE 16

A film prepared as in Preparative Example 1 was soaked in a 0.1% aqueous polyethyleneimine (M.W.=50,000–60,000) solution (by weight) for 5 minutes at room temperature. The film was removed from the solution, drained and dried in a vacuum oven (20 inches (51 cm) mercury) at 100° C. overnight. A portion of the film was placed in N-methylpyrrolidone, a good solvent for the untreated polymer. A small amount of large swollen polymer strands remained out of solution.

The film, which was 1.4 mils ($3.6\times10^{-5}$ m) thick, was tested for mixed gas oxygen/nitrogen (21/79 mole) permeabilities at 495 psig ($341\times10^{4}$ Pa), 24° C. Results are reported below:

$O_2$ Permeability: 100 centiBarrer $O_2/N_2$ Selectivity: 4.5

EXAMPLE 17

A film prepared as in Preparative Example 1 was soaked in a 0.1% aqueous polyethyleneimine (M.W.=50,000-100,000) solution (by weight) for 5 minutes at room temperature. The film was removed from the solution, drained and dried in a vacuum oven (20 inches (51 cm) mercury) at 100° C. overnight. A portion of the film was placed in N-methylpyrrolidone, a good solvent for the untreated polymer. A small amount of large swollen polymer strands remained out of solution.

The film, which was 1.0 mils ($2.5\times10^{-5}$ m) thick, was tested for mixed gas oxygen/nitrogen (21/79 mole) permeabilities at 522 psig ($360\times10^4$ Pa), 24° C. Results are reported below:

$O_2$ Permeability: 600 centiBarrer
$O_2/N_2$ Selectivity: 4.7

PREPARATIVE EXAMPLE 2

To a stirred solution of 2,4,6-trimethyl-1, 3-phenylene diamine (150.24 g, 1.00 mol) in dimethylsulfoxide (2 L) was added 4,4'-[2,2,2-trifluoro-1-(trifluoromethyl)ethylidene]-bis(1,2-benzenedicarboxylic acid anhydride) (6FDA, 224.22 g, 0.505 mol) and 3,3',4,4'-biphenyltetracarboxylic acid dianhydride (148.58 g, 0.505 mol) under a nitrogen atmosphere at room temperature. The resulting very viscous, orange reaction solution was allowed to stir overnight at room temperature. With rapid stirring, a solution of acetic anhydride (408.4 g, 4.0 mol) and triethylamine (404.8 g, 4.0 mol) was added and the resulting viscous reaction solution allowed to stir at room temperature for 4 hours. The polymer solution was precipitated in water. The resulting white solid was collected by filtration and washed twice with water and methanol. After drying overnight by suction, the polymer was further dried in a vacuum oven (20 inches (51 cm) mercury) at 120° C. for 3 hours and at 250° C. for 5 hours.

Films were cast from a 15% solution of the polymer prepared as described above (based on weight) in N-methylpyrrolidone onto a glass plate treated with Du Pont TEFLON ® dry lubricant at 100° C. with a 15 mil ($38\times10^{-5}$ m) knife gap. The films were dried on the plate at 100° C. for 30 minutes, cooled to room temperature and dried in a vacuum oven (20 inches (51 cm) mercury) at room temperature overnight. The films were removed from the plate and dried in a vacuum oven (20 inches (51 cm) mercury) at 120° C. for 4 hours.

The film, which was 1.3 mils ($3.3\times10^{-5}$ m) thick, was tested for mixed gas oxygen/nitrogen (21/79, mole) permeabilities at 505 psig, 24° C. Results are reported below:

$O_2$ Permeability: 4600 centiBarrer
$O_2/N_2$ Selectivity: 3.6

A film prepared as described above, which was 1.6 mils thick, was tested for pure gas nitrogen, helium, and carbon dioxide permeabilities at 600 psig, 600 psig, and 580 psig, respectively, 25° C. Results are reported below:

He Permeability: 23,000 centiBarrer
$CO_2$ Permeability: 65,200 centiBarrer
He/$N_2$ Selectivity: 19
$CO_2/N_2$ Selectivity: 53

EXAMPLE 18

A film prepared as in Preparative Example 2 was soaked in a 10% aqueous ammonium hydroxide solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A clear solution resulted.

The film, which was 1.2 mils ($3.0\times10^{-5}$ m) thick, was tested for mixed gas oxygen/nitrogen (21/79, mole) permeabilities at 513 psig ($354\times10^4$ Pa), 24° C. Results are reported below:

$O_2$ Permeability: 2000 centiBarrer
$O_2/N_2$ Selectivity: 4.4

EXAMPLE 19

A film prepared as in Preparative Example 2 was soaked in a 10% aqueous ammonium hydroxide solution (by weight) for 30 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A very small amount of solids remained out of solution.

The film, which was 1.15 mils ($2.9\times10^{-5}$ m) thick, was tested for mixed gas oxygen/nitrogen (21/79, mole) permeabilities at 513 psig ($354\times10^4$ Pa), 24° C. Results are reported below:

$O_2$ Permeability: 900 centiBarrer
$O_2/N_2$ Selectivity: 4.8

A film prepared as described above, which was 1.8 mils ($4.6\times10^{-5}$ m) thick, was tested for pure gas nitrogen, helium, and carbon dioxide permeabilities at 600 psig ($414\times10^4$ Pa), 25.5° C.±1.5° C. Results are reported below:

He Permeability: 11,700 centiBarrer
$CO_2$ Permeability: 21,100 centiBarrer
He/$N_2$ Selectivity: 90
$CO_2/N_2$ Selectivity: 160

EXAMPLE 20

A film prepared as in Preparative Example 2 was soaked in a 10% aqueous isopropylamine solution (by weight) for 30 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A small amount of solids remain out of solution.

The film, which was 1.4 mils ($3.6\times10^{-5}$ m) thick, was tested for mixed gas oxygen/nitrogen (21/79, mole) permeabilities at 514 psig ($354\times10^4$ Pa), 24° C. Results are reported below:

$O_2$ Permeability: 2500 centiBarrer
$O_2/N_2$ Selectivity: 3.8

EXAMPLE 21

A film prepared as in Preparative Example 2 was soaked in a 10% aqueous isobutylamine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. The film redissolved to form a clear solution.

The film, which was 1.1 mils ($2.8\times10^{-5}$ m) thick, was tested for mixed gas oxygen/nitrogen (21/79, mole)

permeabilities at 515 psig ($355\times10^4$ Pa), 25° C. Results are reported below:

$O_2$ Permeability: 2100 centiBarrer $O_2/N_2$ Selectivity: 4.5

EXAMPLE 22

A film prepared as in Preparative Example 2 was soaked in a 10% aqueous isobutylamine solution (by weight) for 30 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A small amount of solids remained out of solution.

The film, which was 1.2 mils ($3.0\times10^{-5}$ m) thick, was tested for mixed gas oxygen/nitrogen (21/79, mole) permeabilities at 515 psig ($355\times10^4$ Pa), 25° C. Results are reported below:

$O_2$ Permeability: 1100 centiBarrer $O_2/N_2$ Selectivity: 5.1

EXAMPLE 23

A film prepared as in Preparative Example 2 was soaked in a 10% aqueous cyclohexylamine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A clear solution resulted.

The film, which was 1.3 mils ($3.3\times10^{-5}$ m) thick, was tested for mixed gas oxygen/nitrogen (21/79, mole) permeabilities at 509 psig ($351\times10^4$ Pa), 25° C. Results are reported below:

$O_2$ Permeability: 2600 centiBarrer $O_2/N_2$ Selectivity: 4.7

EXAMPLE 24

A film prepared as in Preparative Example 2 was soaked in a 10% aqueous cyclohexylamine solution (by weight) for 30 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A small amount of swollen pieces stayed out of solution.

The film, which was 1.3 mils ($3.3\times10^{-5}$ m) thick, was tested for mixed gas oxygen/nitrogen (21/79, mole) permeabilities at 508 psig ($350\times10^4$ Pa), 25° C. Results are reported below:

$O_2$ Permeability: 200 centiBarrer $O_2/N_2$ Selectivity: 5.8

EXAMPLE 25

A film prepared as in Preparative Example 2 was soaked in a 10% aqueous tris(2-aminoethyl) amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. The film became heavily swollen, but remained out of solution.

The film, which was 1.1 mils ($2.8\times10^{-5}$ m) thick, was tested for mixed gas oxygen/nitrogen (21/79, mole) permeabilities at 520 psig ($358\times10^4$ Pa), 25° C. Results are reported below:

$O_2$ Permeability: 400 centiBarrer $O_2/N_2$ Selectivity: 7.6

EXAMPLE 26

A film prepared as in Preparative Example 2 was soaked in a 1% aqueous triethylenetetramine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A large amount of slightly swollen polymer pieces remained out of solution.

The film, which was 1.2 mils ($3.0\times10^{-5}$ m) thick, was tested for mixed gas oxygen/nitrogen 21/79, mole) permeabilities at 528 psig ($364\times10^4$ Pa), 25° C. Results are reported below:

$O_2$ Permeability: 1900 centiBarrer $O_2/N_2$ Selectivity: 6.1

EXAMPLE 27

A film prepared as in Preparative Example 2 was soaked in a 1% aqueous triethylenetetramine solution (by weight) for 1 hour at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A large amount of slightly swollen polymer pieces remained out of solution.

The film, which was 1.3 mils ($3.3\times10^{-5}$ m) thick, was tested for mixed gas oxygen/nitrogen (21/79, mole) permeabilities at 510 psig ($352\times10^4$ Pa), 25° C. Results are reported below:

$O_2$ Permeability: 600 centiBarrer $O_2/N_2$ Selectivity: 7.2

A film prepared as described above, which was 1.8 mils ($4.6\times10^{-5}$ m) thick, was tested for pure gas nitrogen, helium, and carbon dioxide permeabilities at 600 psig ($414\times10^4$ Pa), 600 psig, and 580 psig ($400\times10^4$ Pa), respectively, 25° C. Results are reported below:

He Permeability: 15,800 centiBarrer $CO_2$ Permeability: 19,400 centiBarrer $He/N_2$ Selectivity: 100

$CO_2/N_2$ Selectivity: 120

EXAMPLE 28

A film prepared as in Preparative Example 2 was soaked in a 1% aqueous pentaethylene hexamine solution (by weight) for 5 minutes at room temperature. The film was removed from the solution, drained and dried in a vacuum oven (20 inches (51 cm) mercury) at 70° C. overnight. A portion of the film was placed in N-methylpyrrolidone, a good solvent for the untreated polymer. A moderate amount of slightly swollen polymer pieces remained out of solution.

The film, which was 1.4 mils ($3.6\times10^{-5}$ m) thick, was tested for mixed gas oxygen/nitrogen (21/79, mole) permeabilities at 532 psig ($367\times10^4$ Pa), 25° C. Results are reported below:

$O_2$ Permeability: 300 centiBarrer $O_2/N_2$ Selectivity: 9.9

PREPARATIVE EXAMPLE 3

To a 50° C. stirred solution of 2,3,5,6-tetramethyl-1,4-phenylene diamine (32.8 g, 0.20 mol) in N-methylpyrrolidone (500 ml) under an inert atmosphere was sequentially added 3,3',4,4'-benzophenone tetracarboxylic dianhydride (3.22 g, 0.0 mol) and 4,4'-[2,2,2-trifluoro-1-(trifluoromethyl)ethylidene]-bis-(1,2,-benzenedicarboxylic acid anhydride) (84.36 g, 0.19 mol, added in four portions, last portion washed in with 250 ml N-methylpyrrolidone) and the resulting yellow solution was stirred overnight at 50° C. A solution of acetic anhydride (75.8 ml, 0.80 mol) and triethylamine (112.9 ml, 0.81 mol) was rapidly added to the reaction solution. After stirring at 50° C. for 2 hours, the yellow reaction solution was precipitated in methanol. The resulting white solid was collected by filtration, washed with methanol and dried in a vacuum oven (20 inches (51 cm) mercury) at room temperature overnight, at 100° C. for 4 hours and at 250° C. for 3 hours to give 112 g product.

Films of the above polymer were cast from a 12.5% polymer solution (based on weight) in N-methylpyrrolidone onto a glass plate treated with Du Pont TEFLON® dry lubricant at 85° C. with a 15 mil ($3.8\times10^{-4}$ m) knife gap. The films were dried on the plate at 85° C. for 25 minutes, cooled to room temperature and dried in a vacuum oven (20 inches (51 cm) mercury) at room temperature overnight. The films were stripped off the plate and further dried in a vacuum oven (20 inches (51 cm) mercury) at 120° C. for 4 hours.

Films of the above polymer were tested for mixed gas $O_2/N_2$ (21/79, mole) permeabilities at 300 psig (2 k Pa), 25° C. Results are reported below:

$O_2$ Productivity: 14,100 centiBarrer $O_2/N_2$ Selectivity: 3.4

EXAMPLE 30

A film prepared as in Preparative Example 3 was soaked in a 10% aqueous tris(2-aminoethyl)amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. The slightly swollen film remained out of solution.

The film, which was 1.15 mils ($2.9\times10^{-5}$ m) thick, was tested for mixed gas oxygen/nitrogen (21/79, mole) permeabilities at 567 psig ($391\times10^4$ Pa), 25° C. Results are reported below:

$O_2$ Permeability: 300 centiBarrer $O_2/N_2$ Selectivity: 8.9

PREPARATIVE EXAMPLE 4

To a stirred solution of 2,4,6-trimethyl-1,3-phenylene diamine (37.6 g, 0.25mol) and 3,5-diaminochlorobenzene (36.2 g, 0.25 mol) in dimethylsulfoxide (1 L) was added 4,4'-[2,2,2-trifluoro-1-(trifluoromethyl)ethylidene]-bis(1,2-benzenedicarboxylic acid anhydride) (6FDA, 223.1 g, 0.503 mol) under a nitrogen atmosphere at room temperature. The resulting very viscous, dark reaction solution was allowed to stir for 3.5 hours at room temperature. With rapid stirring, a solution of acetic anhydride (188.7 ml, 2 mol) and triethylamine (278.76 ml, 2 mol) was added and the resulting dark, very viscous reaction solution was allowed to stir overnight at room temperature. The polymer solution was precipitated in water and the resulting solid collected by filtration washed twice with water and methanol. After drying overnight by suction, the polymer was further dried in a vacuum oven (20 inches (51 cm) mercury) at 120° C. for 3 hours and at 250° C. for 5 hours to yield 278 g product.

Films were cast from a 15% solution of the polymer prepared as described above (based on weight) in N-methylpyrrolidone onto a glass plate treated with Du Pont TEFLON® dry lubricant at 100° C. with a 15-mil ($38\times10^{-5}$ m) knife gap. The films were dried on the plate at 100° C. for 30 minutes, cooled to room temperature, and dried in a vacuum oven (20 inches (51 cm) mercury) at room temperature overnight. The films were removed from the plate and dried in a vacuum oven (20 inches (51 cm) mercury) at 120° C. for 4 hours.

A film, prepared as above with a thickness of 1.4 mils ($3.6\times10^{-5}$ m), was tested for mixed gas oxygen/nitrogen (21/79, mole) permeabilities at 495 psig ($341\times10^4$ Pa), 25° C. Results are reported below:

$O_2$ Permeability: 7800 centiBarrer $O_2/N_2$ Selectivity: 3.8

EXAMPLE 31

A film prepared as in Preparative Example 4 was soaked in a 10% aqueous tris(2-aminoethyl)amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. The slightly swollen film remained out of solution.

The film, which was 1.05 mils ($2.78\times10-5$ m) thick, was tested for mixed gas oxygen/nitrogen (21/79, mole) permeabilities at 562 psig ($387\times10^4$ Pa), 25° C. Results are reported below:

$O_2$ Permeability: 300 centiBarrer $O_2/N_2$ Selectivity: 5.9

PREPARATIVE EXAMPLE 5

To a rapidly stirred solution of 2,3,5,6-tetramethyl-1,4-phenylene diamine (32.6 g, 0.20 mol) in N-methylpyrrolidone (500 ml) under an inert atmosphere at 50° C. was added 1,2,4,5-benzenetetracarboxylic dianhydride (8.73 g, 0.04 mol). To the resulting solution was portionwise added 4,4'-[2,2,2-trifluoro-1-(trifluoromethyl)-ethylidene]bis(1,2-benzenedicarboxylic acid anhydride) (71.04 g, 0.16 mol, in 4 portions, last portion washed in with 250 ml N-methylpyrrolidone). The reaction solution was allowed to stir at 50° C. overnight. A solution of acetic anhydride (75.8 ml, 0.80 mol) and triethylamine (112.9 ml, 0.81 mol) was added with rapid stirring and the viscous yellow solution was allowed to stir an additional 2 hours at 50° C. The polymer was precipitated in methanol, collected by filtration, washed with methanol, and air dried. The off-white polymer was further dried in a vacuum oven (20 inches (51 cm) mercury) at room temperature overnight, at 100C. for 3 hours, and at 250 C. for 4 hours to give 105 g product.

Films of the polymer prepared above were cast from a 10% polymer solution (based on weight) in N-methylpyrrolidone onto a glass plate treated with Du Pont TEFLON® dry lubricant at 80° C. with a 15 mil ($3.8\times10^{-5}$) knife gap. The films were dried on the plate at 80° C. for 25 minutes, cooled to room temperature, stripped off the plate and dried in a vacuum oven (20 inches (51 cm) mercury) at room temperature overnight and at 120° C. for 4 hours. The films were then tested for mixed gas oxygen/nitrogen (21/79, mole) permeabilities at 300 psig ($20.7\times10^5$ Pa), 25 ° C. The results are reported below:

$O_2$ Productivity: 16,400 centiBarrer $O_2/N_2$ Selectivity: 3.4 and $O_2$ Productivity: 22,000 centiBarrer $O_2/N_2$ Selectivity: 3.2

EXAMPLE 32

A film prepared as in Preparative Example 5 was soaked in a 10% aqueous tris(2-aminoethyl)amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. A small amount of polymer remained out of solution.

The film, which was 0.85 mils ($2.2\times10^{-5}$ m) thick, was tested for mixed gas oxygen/nitrogen (21/79, mole) permeabilities at 571 psig ($394\times10^4$ Pa), 25° C. Results are reported below:

$O_2$ Permeability: 800 centiBarrer $O_2/N_2$ Selectivity: 9.7

PREPARATIVE EXAMPLE 6

To a stirred solution of 2,4,6-trimethyl-1,3-phenylene diamine (22.5 g, 0.15 mol) and bis(4-aminophenoxy)-1,4-biphenyl (18.6 g, 0.05 mol) in dimethylsulfoxide (500 ml) was added 4,4'-[2,2,2-trifluoro-1-(trifluoromethyl)ethylidene]-bis(1,2-benzenedicarboxylic acid anhydride) (6FDA, 89.7 g, 0.202 mol) under a nitrogen atmosphere at room temperature. The resulting very viscous reaction solution was stirred at room temperature for 1.75 hours. With rapid stirring, a solution of acetic anhydride (75.5 ml, 0.8 mol) and triethylamine (111.5 ml, 0.8 mol) was added and then resulting very viscous reaction solution was allowed to stir overnight at room temperature. The polymer solution was precipitated in water. The resulting white solid was collected by filtration, washed twice with water and methanol, and allowed to dry by suction overnight. The polymer was further dried in a vacuum oven (20 inches (51 cm) mercury) at 120° C. for 3 hours and at 230° C. for 4 hours to give 123.6 g of a white product.

Films were cast from a 15% solution of the polymer prepared as described above (based on weight) in N-methylpyrrolidone onto a glass plate treated with Du Pont TEFLON® dry lubricant at 100° C. for 30 minutes, cooled to room temperature and dried in a vacuum oven (20 inches (51 cm) mercury) at room temperature overnight. The films were removed from the plate and dried in a vacuum oven (20 inches (51 cm) mercury) at 120° C. for 4 hours.

The film, which was 1.4 mils ($3.6\times10^{-5}$ m) thick, was tested for mixed gas oxygen/nitrogen (22/79, mole) permeabilities at 530 psig ($365\times10^4$ Pa), 25° C. Results are reported below:

$O_2$ Permeability: 2300 centiBarrer $O_2/N_2$ Selectivity: 4.5

EXAMPLE 33

A film prepared as in Preparative Example 6 was soaked in a 10% aqueous tris(2-aminoethyl)amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. A large amount of polymer remained out of solution.

The film, which was 1.3 mils ($3.3\times10^{-5}$ m) thick, was tested for mixed gas oxygen/nitrogen (21/79, mole) permeabilities at 539 psig ($372\times10^4$ Pa), 25° C. Results are reported below:

$O_2$ Permeability: 1100 centiBarrer $O_2/N_2$ Selectivity: 5.4

PREPARATIVE EXAMPLE 7

To a stirred solution of 2,4,6-trimethyl-1,3-phenylene diamine (22.53 g, 0.15 mol) and bis(4-aminophenoxy)-1,4-biphenyl (14.64 g, 0.05 mol) in dimethylsulfoxide (500 ml) was added 4,4'-[2,2,2-trifluoro-1-(trifluoromethyl)ethylidene]-bis(1,2-benzenedicarboxylic acid anhydride) (6FDA, 89.69 g, 0.202 mol) under a nitrogen atmosphere at room temperature. The resulting very viscous golden solution was stirred at room temperature for 3.5 hours. A solution of acetic anhydride (75.48 ml, 0.80 mol) and triethylamine (111.50 ml, 0.80 mol) was added at room temperature with rapid stirring. After stirring at room temperature overnight, the reaction solution was precipitated in water. The resulting solid was washed twice with water and twice with methanol. The polymer was air-dried overnight and then dried in a vacuum oven (20 inches (51 cm) mercury) at 120 C. for 3 hours and at 250° C. for 5 hours to give 116.6 g product.

This polyimide was found to be soluble in acetone, methylene dichloride, dimethylsulfoxide, N-methylpyrrolidone, m-cresol, and N,N-dimethylacetamide.

Films were cast from a 15% solution of the polymer prepared as described above (based on weight) in N-methylpyrrolidone onto a glass plate treated with Du Pont TEFLON® dry lubricant at 100° C. for 30 minutes, cooled to room temperature and dried in a vacuum oven (20 inches (51 cm) mercury) at room temperature overnight. The films were removed from the plate and dried in a vacuum oven (20 inches (51 cm) mercury) at 120° C. for 4 hours.

The film, prepared as above, which was 1.25 mils ($3.2\times10^{-5}$ m) thick, was tested for mixed gas oxygen/-nitrogen (21/79, mole) permeabilities at 500 psig ($348\times10^4$ Pa), 25° C. Results are reported below:

$O_2$ Permeability: 6600 centiBarrer $O_2/N_2$ Selectivity: 4.3

EXAMPLE 34

A film prepared as in Preparative Example 7 was soaked in a 10% aqueous tris(2-aminoethyl)amine solution (by weight) for 1 hour at room temperature. The film was removed from the solution, drained and dried in a vacuum oven (20 inches (51 cm) mercury) at 60° C. overnight. A portion of the film was placed in N-methylpyrrolidone, a good solvent for the untreated polymer. A large amount of polymer remained out of solution.

The film, which was 1.1 mils ($2.8\times10^{-5}$ m) thick, was tested for mixed gas oxygen/nitrogen (21/79, mole) permeabilities at 540 psig ($372\times10^4$ Pa), 25° C. Results are reported below:

$O_2$ Permeability: 600 centiBarrer $O_2/N_2$ Selectivity: 6.0

I claim:

1. A process for treating a membrane containing a plurality of imide functions comprising supplying ammonia or an amino compound containing 1 to 5,000 amino groups to said membrane.

2. The process of claim 1 wherein the membrane is formed from a polyimide.

3. The process of claim 2 wherein the ammonia or amino compound is supplied to at least one side of the membrane.

4. The process of claim 3 wherein the amino compound is an aromatic compound containing 2 or 3 amino groups and from 6 to 30 carbon atoms or an aliphatic amino compound containing 2 to 6 amino groups and 1 to 40 carbon atoms.

5. The process of claim 4 wherein the polyimide is an aromatic polyimide.

6. The process of claim 5 wherein the aromatic polyimide prior to treatment with the amino compound consists essentially of the following recurring structural units

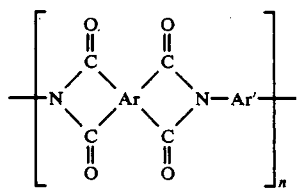

where <Ar> is a radical selected from the group consisting of

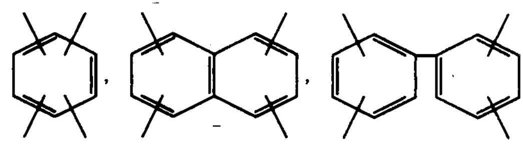

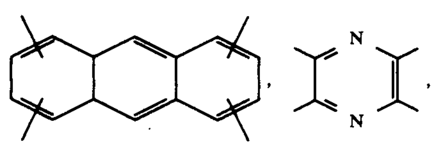

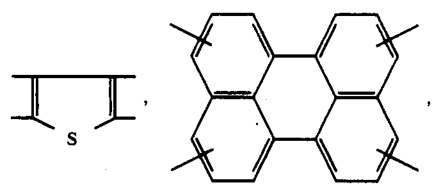

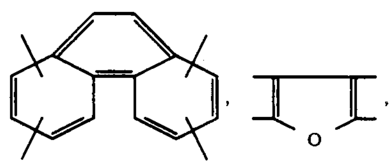

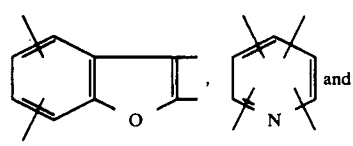

-continued

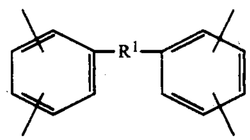

where $R^1$ is selected from the group consisting of an alkylene chain having 1-3 carbon atoms,

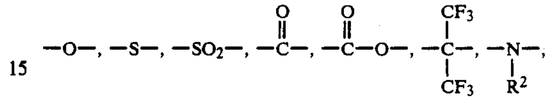

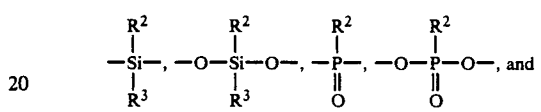

where $R^2$ and $R^3$ are selected from the group consisting of alkyl and aryl, —$Ar^1$— is a radical selected from the group consisting of

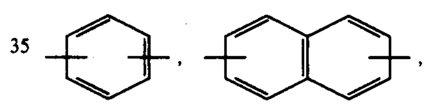

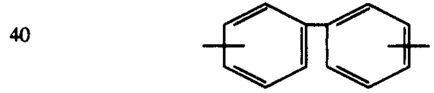

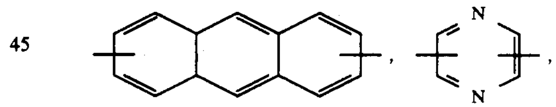

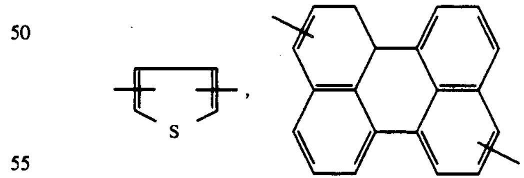

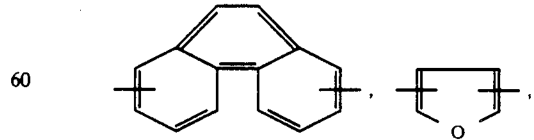

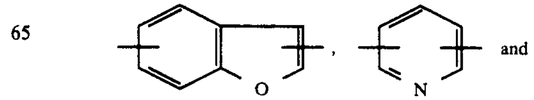

-continued

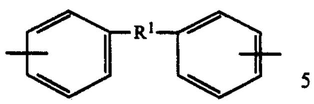

where $R^1$ has the same meaning as above, and n is a number sufficient that said polymer has an inherent viscosity of at least 0.1 as measured at 30° C. on an 0.5% by weight solution in concentrated sulfuric acid.

7. The process of claim 6 wherein the amino compound is selected from the group consisting of cyclohexylamine, 1,6-hexane diamine, 3-aminopropylmethyldiethoxysilane, tris(2-aminoethyl)amine, triethylenetetramine, pentaethylenehexamine, polyether diamines based predominantly on a polyethylene oxide backbone with a molecular weight of 50 to 20,000, trimethoxysilylpropyl-substituted polyethyleneamine having a molecular weight of 200 to 200,000, polyethyleneamine having a molecular weight of 1,000 to 200,000, aqueous ammonium hyroxide, and isobutyl amine.

8. A process for separating at least one gas from a mixture of gases comprising bringing said mixture of gases under pressure into contact with an aromatic polyimide gas separation prepared in accordance with claim 1 whereby one of the gases permeates said membrane preferentially with respect to at least one other gas in said mixture of gases.

9. A separation membrane which contains a plurality of imide functions at least some of said imide functions have been reacted with ammonia or an amino compound containing 1 to 5,000 amino groups said membrane exhibiting improved selectivity with respect to permeation by at least one pair of gases.

10. An aromatic polyimide gas separation membrane comprising a plurality of imide functions which have been reacted with ammonium hydroxide or an amino compound containing 1 to 5,000 amino groups.

11. The gas separation membrane of claim 10 wherein the aromatic polyimide prior to treatment with the amino compound consisted essentially of the following recurring structural units

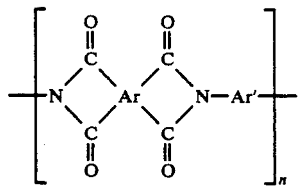

where —Ar'— is a radical selected from the group consisting of

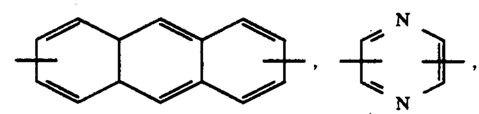

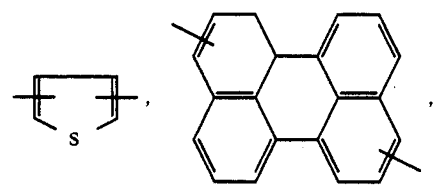

-continued

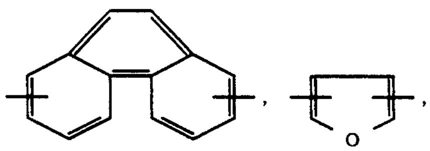

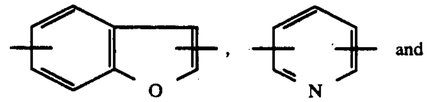

and

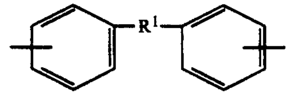

where $R^1$ is selected from the group consisting of an alkylene chain having 1–3 carbon atoms,

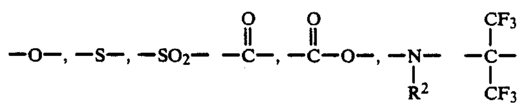

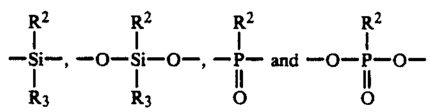

where $R^2$ and $R^3$ are selected from the group consisting of alkyl and aryl, <Ar> is a radical selected from the group consisting of

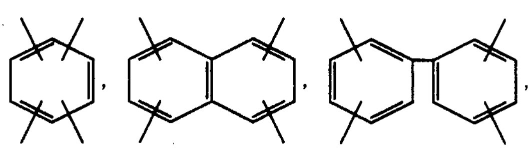

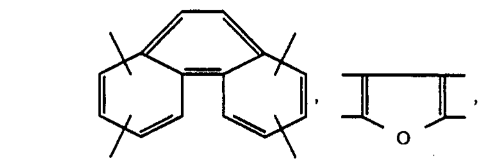

-continued

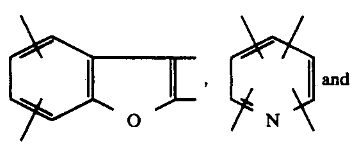

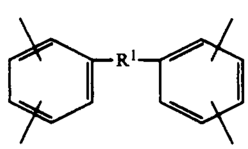

where $R^1$ has the same meaning as above, and n is a number sufficient that said polymer has an inherent viscosity of at least 0.1 as measured at 30° C. on an 0.5% by weight solution in concentrated sulfuric acid.

12. The gas separation membrane of claim 11 wherein said amino compound is selected from the group consisting of cyclohexylamine, 1,6-hexane diamine, 3-aminopropylmethyldiethoxysilane, tris(2-aminoethyl)amine triethylenetetramine, pentaethylenehexamine, polyether diamines based predominantly on a polyethylene oxide backbone with a molecular weight of 50 to 20,000, trimethoxysilylpropyl-substituted polyethyleneamine having a molecular weight of 200 to 200,000, aqueous ammonium hydroxide, and isobutyl amine.

* * * * *